(12) United States Patent
Hsieh et al.

(10) Patent No.: US 10,162,398 B2
(45) Date of Patent: Dec. 25, 2018

(54) METHOD AND ASSOCIATED APPARATUS FOR PERFORMING POWER MANAGEMENT IN AN ELECTRONIC SYSTEM

(71) Applicant: Synology Incorporated, Taipei (TW)

(72) Inventors: Yen-Li Hsieh, Kaohsiung (TW);
Ming-Hung Tsai, New Taipei (TW);
Chien-An Lin, New Taipei (TW);
Chi-Lei Ho, Tainan (TW)

(73) Assignee: Synology Incorporated (TW)

( * ) Notice: Subject to any disclaimer, the term of this patent is extended or adjusted under 35 U.S.C. 154(b) by 182 days.

(21) Appl. No.: 15/068,656

(22) Filed: Mar. 14, 2016

(65) Prior Publication Data

US 2016/0320817 A1 Nov. 3, 2016

(30) Foreign Application Priority Data

Apr. 30, 2015 (TW) .............................. 104113934 A

(51) Int. Cl.
*G06F 1/26* (2006.01)
*G06F 1/32* (2006.01)

(52) U.S. Cl.
CPC ................ *G06F 1/26* (2013.01); *G06F 1/266* (2013.01); *G06F 1/3221* (2013.01); *G06F 1/3268* (2013.01); *Y02D 10/154* (2018.01)

(58) Field of Classification Search
CPC ..................................... G06F 1/26; G06F 1/32
See application file for complete search history.

(56) References Cited

U.S. PATENT DOCUMENTS

| | | | |
|---|---|---|---|
| 8,680,708 | B2 | 3/2014 | Shirai |
| 2009/0316541 | A1 | 12/2009 | Takada |
| 2010/0100757 | A1 | 4/2010 | Takada |
| 2011/0099391 | A1 | 4/2011 | Ogawa |
| 2011/0099396 | A1 | 4/2011 | Sakagami |

(Continued)

FOREIGN PATENT DOCUMENTS

| | | |
|---|---|---|
| CN | 101676825 A | 3/2010 |
| CN | 102656538 A | 9/2012 |

(Continued)

*Primary Examiner* — Kim Huynh
*Assistant Examiner* — Kevin M Stewart
(74) *Attorney, Agent, or Firm* — Stevens & Showalter, LLP

(57) ABSTRACT

A method for performing power management in an electronic system and associated apparatus are provided, where the method is applied to at least one electronic device of a plurality of electronic devices of the electronic system. Based on the method, the electronic system utilizes a control electronic device within the plurality of electronic devices to send a first turning on signal to a first electronic device within the plurality of electronic devices to trigger the first electronic device to turn on, wherein the first electronic device is coupled to the control electronic device. The electronic system utilizes the first electronic device to send a second turning on signal to a second electronic device within the plurality of electronic devices to trigger the second electronic device to turn on, wherein the second electronic device is coupled to the control electronic device through the first electronic device.

17 Claims, 11 Drawing Sheets

(56) References Cited

U.S. PATENT DOCUMENTS

| | | | | |
|---|---|---|---|---|
| 2011/0145556 | A1* | 6/2011 | Hakoun | G06F 1/266 |
| | | | | 713/1 |
| 2013/0333936 | A1* | 12/2013 | Gundel | H01B 7/0838 |
| | | | | 174/350 |
| 2015/0185799 | A1* | 7/2015 | Robles | G06F 1/32 |
| | | | | 713/320 |
| 2016/0021734 | A1* | 1/2016 | Srivastava | H01L 23/64 |
| | | | | 307/89 |

FOREIGN PATENT DOCUMENTS

| | | | | |
|---|---|---|---|---|
| CN | 102870170 | A | 1/2013 | |
| EP | 0903671 | A2 * | 3/1999 | ......... G06F 13/4081 |
| TW | 200839615 | | 10/2008 | |
| TW | 201430703 | A | 8/2014 | |

* cited by examiner

METHOD AND ASSOCIATED APPARATUS FOR PERFORMING POWER MANAGEMENT IN AN ELECTRONIC SYSTEM

BACKGROUND OF THE INVENTION

1. Field of the Invention

The present invention relates to the field of power management, such as the power management of a data storage system adopting a Serial Attached Small Computer System Interface (Serial Attached SCSI or SAS) technique, and more particularly, to a method for performing power management in an electronic system, and an associated apparatus.

2. Description of the Prior Art

A conventional data storage system, such as those implemented with the SAS technique or an SAS expander, may lack a power management scheme. When the conventional data storage system is set up and provided with power, it may operate continuously, unless power outage or power failure occurs, in which case it will stop operating. In another example, when building a plurality of storage modules (e.g. a plurality of conventional enclosures) of the conventional data storage system and a conventional enclosure is installed to a cabinet (or a frame) which has the ability of providing power, the conventional enclosure will operate continuously unless power outage or power failure occurs.

Since each conventional enclosure in the conventional data storage system may install more than twenty hard disk drives (HDDs), the overall power consumption of the conventional data storage system is very high. Without a proper power management scheme, much power will be consumed when the conventional data storage system accesses the hard disk drives therein. When a data access request is not needed, the access operation of each of the HDDs within the aforementioned conventional enclosure may be temporarily suspended, thus reducing the power consumption thereof. Taking a scheme comprising two headers and fifteen enclosures as an example, however, the overall power consumption of the conventional data storage system may still exceed 3500 Watts.

From the above it is therefore demonstrated that the HDDs in the conventional data storage system consume much power when being accessed. Although the overall power consumption may be somewhat reduced due to suspending of the HDDs in each enclosure, the power consumption of the conventional data storage system is still very high. Therefore, there is a need for a novel method and an associated scheme to save power.

SUMMARY OF THE INVENTION

An objective of the present invention is to provide a method and an associated apparatus for performing power management in an electronic system, to solve the aforementioned problems.

Another objective of the present invention is to provide a method and an associated apparatus for performing power management in an electronic system, to reduce the power consumption of the electronic system.

Another objective of the present invention is to provide a method and an associated apparatus for performing power management in an electronic system, to properly turn on or turn off the electronic system without introducing any side effects.

At least one preferred embodiment of the present invention provides a method for performing power management in an electronic system. The method is applied to a first electronic device within a plurality of electronic devices of the electronic system. The method comprises: when a first turning on signal transmitted from another electronic device within the plurality of electronic devices is received, utilizing a power management circuit of the first electronic device to provide power to a processing circuit of the first electronic device according to the first turning on signal in order to trigger to turn on the first electronic device, wherein the first electronic device is coupled to the other electronic device; and utilizing the power management circuit of the first electronic device to transmit a second turning on signal to a second electronic device within the plurality of electronic devices through an interface circuit of the first electronic device in order to trigger to turn on the second electronic device, wherein the second electronic device is coupled to the other electronic device through the first electronic device. In addition to the above method, the present invention also provides a computer programmable product, wherein the computer programmable product comprises a program code for indicating at least one processor to execute the above method, and the electronic system comprises the aforementioned at least one processor.

In addition to the above method, the present invention also correspondingly provides an apparatus for performing power management in an electronic system. The apparatus comprises at least a portion of a first electronic device within a plurality of electronic devices of the electronic system. The apparatus also comprises a processing circuit, at least one interface circuit and a power management circuit. The processing circuit is arranged to control an operation of the first electronic device. The interface circuit is coupled to the processing circuit, and electrically connected to at least another electronic device within the plurality of electronic devices through at least one cable. The power management circuit is coupled to the interface circuit and the processing circuit. The power management circuit is arranged to control power of the processing circuit. When the power management circuit receives a first turning on signal transmitted by another electronic device within the plurality of electronic devices through the interface circuit, the power management circuit turns on the processing circuit and provides power to the processing circuit according to the first turning on signal. The first electronic device is coupled to the other electronic device through the interface circuit, and the power management circuit transmits a second turning on signal to a second electronic device within the plurality of electronic devices through the interface circuit in order to trigger to turn on the second electronic device, wherein the second electronic device is coupled to the other electronic device through the first electronic device. In addition to the above method, the present invention also correspondingly provides a computer program product. The computer program product includes a program code for indicating at least one processor to perform the above method, and the electronic system comprises the processor.

Further, the present invention also correspondingly provides an apparatus for performing power management in an electronic system. The apparatus comprises at least a portion of a first electronic device within a plurality of electronic devices of the electronic system. The apparatus also comprises a processing circuit, at least one interface circuit and a power management circuit. The processing circuit is arranged to control an operation of the control electronic device. The interface circuit is coupled to the processing circuit, and is arranged to electrically connect to at least another electronic device within the plurality of electronic devices through at least one cable to allow the control electronic device to control the electronic system. The power management circuit is coupled to the interface circuit and the processing circuit, and is arranged to control power of the processing circuit. The power management circuit transmits a first turning on signal to a first electronic device within the plurality of electronic devices through the interface circuit in order to trigger to turn on the first electronic device, wherein the first electronic device is coupled to the control electronic device, and when the first electronic device is turned on, the power management circuit utilizes the first electronic device to transmit a second turning on signal to a second electronic device within the plurality of electronic devices in order to trigger to turn on the second electronic device, wherein the second electronic device is coupled to the control electronic device through the first electronic device.

Moreover, at least one preferred embodiment of the present invention provides a method for performing power management in an electronic system. The method is applied to a control electronic device of a plurality of electronic devices of the electronic system. The method comprises: utilizing a power management circuit of the control electronic device to transmit a first turning on signal to a first electronic device within the plurality of electronic devices through an interface circuit of the control electronic device in order to trigger to turn on the first electronic device, wherein the first electronic device is coupled to the control electronic device; and when the first electronic device is turned on, utilizing the first electronic device to transmit a second turning on signal to a second electronic device within the plurality of electronic devices to turn the second electronic device, wherein the second electronic device is coupled to the control electronic device through the first electronic device.

An advantage provided by the present invention is that the power consumption of the electronic system may be reduced. Further, the method and apparatus provided by the present invention may properly turn on or turn off the electronic system without introducing a side effect. For example, the plurality of electronic devices maybe turned on one by one which prevents the overall instantaneous power consumption of the electronic system from exceeding a predetermined instantaneous power consumption upper bound value. In another example, the plurality of electronic devices may be divided into a plurality of sets, and these sets of electronic devices are turned on set by set to prevent the overall instantaneous power consumption of the electronic system from exceeding the predetermined instantaneous power consumption upper bound value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
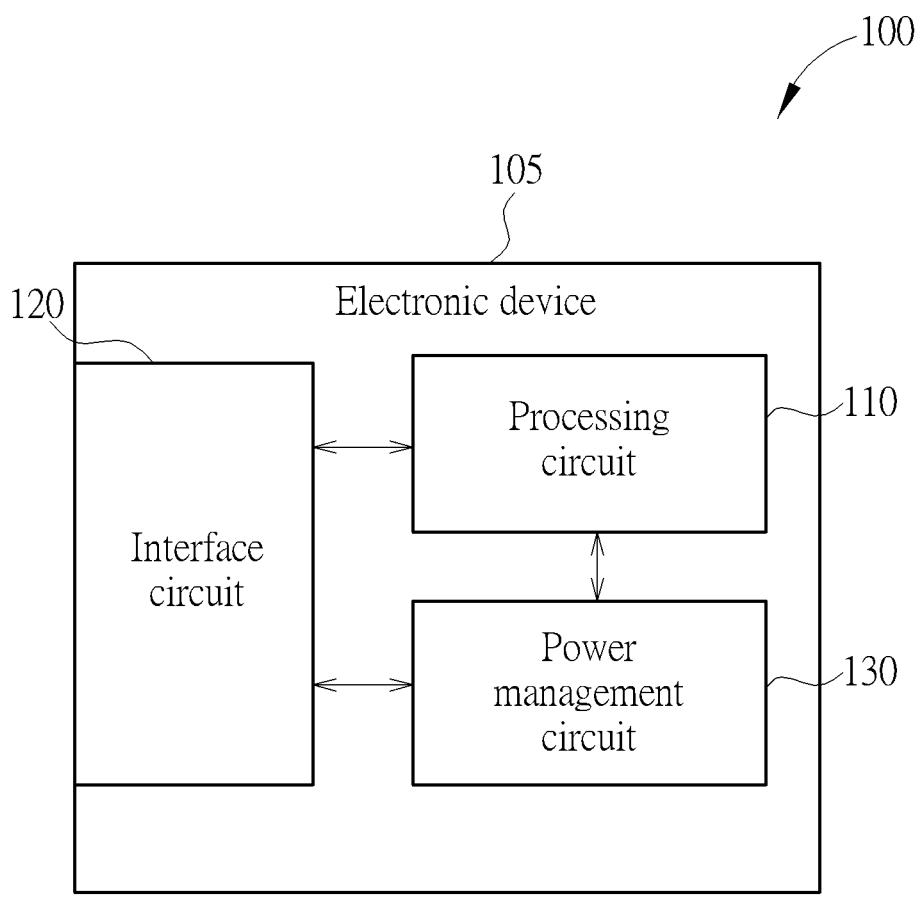
FIG. 1 is a diagram illustrating an apparatus for performing power management in an electronic system according to an embodiment of the present invention.

FIG. 1 is a diagram illustrating an apparatus 100 for performing power management in an electronic system according to an embodiment of the present invention, wherein the electronic system comprises a plurality of electronic devices, and the apparatus 100 may comprise at least a portion of (e.g. part or all of) the electronic system. For example, the apparatus 100 may be a control circuit in a specific electronic device within the plurality of electronic devices, such as an integrated circuit (IC) in the electronic device. In another example, the apparatus 100 may be the whole electronic device comprising the control circuit. In yet another example, the apparatus 100 may be at least two electronic devices within the plurality of electronic devices. In still another example, the apparatus 100 may be the whole electronic system. Examples of the electronic system may comprise (but are not limited to): a data storage system implemented with a serial attached small computer system interface (serial attached SCSI or SAS) technique, and a storage system implemented with the SAS Expander technique. Examples of the plurality of electronic devices may comprise (but are not limited to): a header and an enclosure implemented with the SAS expander technique.

As shown in FIG. 1, the apparatus 100 comprises: a processing circuit 110 installed in the electronic device such as the electronic device 105; at least one interface circuit (e.g. one or more interface circuits, such as the interface circuit 120) coupled to the processing circuit 110 and installed in the electronic device 105; and a power management circuit 130, coupled to the aforementioned interface circuit (e.g. the interface circuit 120) and the processing circuit 110, wherein the power management circuit 130 is installed in the electronic device 105. According to this embodiment, the processing circuit 110 is arranged to control operations of the electronic device 105. Further, the interface circuit is used to electrically connect to at least another electronic device within the plurality of electronic devices through at least one cable. For example, the electronic device 105 may be the control electronic device. In another example, the electronic device 105 may be any of the plurality of electronic devices except for the control electronic device, e.g. the electronic device 105 may be a first electronic device or a second electronic device. Further, the power management circuit 130 is arranged to control the power of the processing circuit 110. The power management circuit 130 may selectively provide power to the processing circuit 110 or stop providing power to the processing circuit 110. For example, the power management circuit 130 may continuously provide power to the processing circuit 110 to make the electronic device 105 stay in a turned-on mode. In another example, the power management circuit 130 may stop providing power to the processing circuit 110 to make the electronic device 105 stay in a turned-off mode, wherein the turned-off mode is also known as a standby mode.

In practice, the control electronic device may be implemented as the enclosure mentioned in this embodiment according to the SAS expander technique, and any of the plurality of electronic devices except for the control electronic device may be implemented as the enclosure mentioned in this embodiment according to the SAS expander technique, wherein no matter whether the electronic device 105 represents the control electronic device or any of the plurality of electronic devices except for the control electronic device, the interface circuit (e.g. the interface circuit 120) may be implemented as a corresponding SAS interface circuit according to the SAS expander technique. Hence, the electronic system may be implemented as a data storage system according to the SAS expander technique. Further, one or more electronic devices within the plurality of electronic devices (e.g. all of the plurality of electronic devices, or any of the plurality of electronic devices except for the first electronic device and the second electronic device, etc.) may comprise a plurality of storage devices. More particularly, the plurality of storage devices comprise at least one hard disk drive (HDD) or at least one solid state drive (SSD), such as a plurality of HDDs and/or a plurality of SSDs. For example, the data storage system may be implemented as a server, and a user may access data in the data storage system through at least one network. The power management circuit 130 may be implemented with a programmable logic controller (PLC) or a complex programmable logic device (CPLD).

The processing circuit 110 may comprise at least one processor arranged for executing a program code 110B, and the processing circuit 110 executing the program code 110B may control operations of the electronic device 105 to provide services for users. If necessary, the processing circuit 110 executing the program code 110B may execute settings related to power management (e.g. setting a power-on group), and obtain power consumption information of the electronic device 105, such as the power of the electronic device 105 in a sleep mode, the instantaneous power of the electronic device 105 just awakened from a standby mode, or the power of the electronic device 105 in a normal operation mode, wherein the program code 110B may represent programs executed in the electronic device 105, and more particularly, represent at least one program module such as at least one software module. This is merely for illustrative purposes, and not meant to be limitations of the present invention. According to some modifications of this embodiment, a program code 110B may be embedded in the processing circuit 110, and the aforementioned program module may be a hardware circuit, such as at least a portion of (e.g. part or all of) the processing circuit 110.

Figure 2:
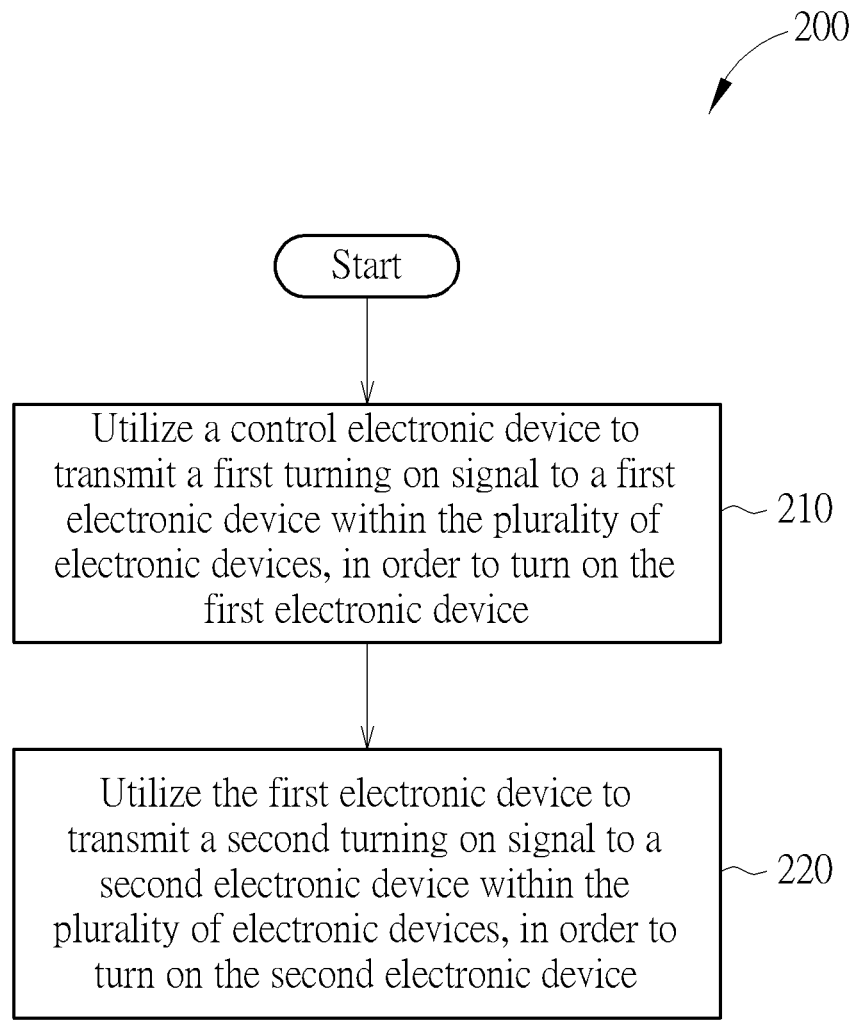
FIG. 2 is a flowchart illustrating a method for performing power management in an electronic system according to an embodiment of the present invention.

FIG. 2 is a flowchart illustrating a method for performing power management in an electronic system according to an embodiment of the present invention. The method may be applied to the apparatus 100 shown in FIG. 1, and more particularly, to the processing circuit 110 executing the program code 110B. By utilizing a computer programmable product such as a compact disc (CD) storing the program code 110B, a user or an administrator of the electronic system may configure the program code 110B in the apparatus 100, wherein the computer programmable product comprises the program code 110B (more particularly an installation version thereof) for indicating the processor to perform the method 200 shown in FIG. 2. Hence, the processing circuit 110 may control operations of the electronic system (more particularly the electronic device 105), to perform the method 200 shown in FIG. 2. The method is described in the following section.

In Step 210, the electronic system utilizes the control electronic device to transmit a first turning on signal to the first electronic device within the plurality of electronic devices in order to trigger to turn on the first electronic device. For example, the power management circuit 130 of the control electronic device may transmit the first turning on signal to the first electronic device through the interface circuit 120 of the control electronic device in order to trigger to turn on the first electronic device. When the first turning on signal transmitted from the control electronic device is received, the first electronic device may be turned on by the first turning on signal. For example, the power management circuit 130 of the first electronic device may receive the first turning on signal through the interface circuit 120 of the first electronic device. More particularly, when the first turning on signal is received, the power management circuit 130 of the first electronic device may provide power to the processing circuit 110 of the first electronic device in response to triggering of the first turning on signal in order to trigger to turn on the first electronic device, wherein the first electronic device may represent a specific electronic device within the plurality of electronic devices except for the control electronic device.

In Step 220, the electronic system utilizes the first electronic device to transmit a second turning on signal to the second electronic device within the plurality of electronic devices in order to trigger to turn on the second electronic device, wherein the second electronic device is coupled to the control electronic device through the first electronic device. For example, the power management circuit 130 of the first electronic device may transmit the second turning on signal to the second electronic device through an interface circuit 120 of the first electronic device in order to trigger to turn on the second electronic device. When the second turning on signal transmitted from the first electronic device is received, the second electronic device is turned on by the second turning on signal. For example, the power management circuit 130 of the second electronic device may receive the second turning on signal through the interface circuit 120 of the second electronic device. More particularly, when the second turning on signal is received, the power management circuit 130 of the second electronic device may provide power to the processing circuit 110 of the second electronic device due to the trigger of the second turning on signal in order to trigger to turn on the second electronic device. Hence, by turning on the first electronic device, the control electronic device (more particularly the power management circuit 130 therein) may utilize the first electronic device to transmit the second turning on signal to the second electronic device in order to trigger to turn on the second electronic device, wherein the second electronic device may represent a specific electronic device within the plurality of electronic devices except for the control electronic device and the first electronic device.

According to this embodiment, the control electronic device may be implemented as the aforementioned enclosure according to the SAS expander technique, and any of the plurality of electronic devices except for the control electronic device may be implemented as the aforementioned enclosure according to the SAS expander technique. For example, the plurality of electronic devices may be coupled in series in a string through a plurality of cables (e.g. the cables conforming to the SAS specification).

In practice, the timing of triggering to turn on the second electronic device may be later than the timing of triggering to turn on the first electronic device, in order to prevent the overall instantaneous power consumption of the electronic system from exceeding a predetermined instantaneous power consumption upper bound value.

According to some embodiments, the plurality of electronic devices may comprise a first set of electronic devices and a second set of electronic devices, and the first set of electronic devices may comprise the first electronic device and the second electronic device. Further, an electronic device within the first set of electronic devices may transmit a turning on signal to an electronic device within the second set of electronic devices in order to trigger to turn on the second set of electronic devices, wherein the second set of electronic devices are coupled to the first set of electronic devices. More particularly, the timing of triggering to turn on the second set of electronic devices may be later than the timing of triggering to turn on the first set of electronic devices, in order to prevent the overall instantaneous power consumption of the electronic system from exceeding the predetermined instantaneous power consumption upper bound value. The plurality of electronic devices may comprise at least another set of electronic devices, such as a third set of electronic devices. An electronic device within the second set of electronic devices may transmit a turning on signal to an electronic device within the third set of electronic devices in order to trigger to turn on the third set of electronic devices, wherein the third set of electronic devices are coupled to the first set of electronic devices through the second set of electronic devices. More particularly, the timing of triggering to turn on the third set of electronic devices may be later than the timing of triggering to turn on the second set of electronic devices, in order to prevent the overall instantaneous power consumption of the electronic system from exceeding the predetermined instantaneous power consumption upper bound value. Note that each of these turning on signals (e.g. the first turning on signal, the second turning on signal, etc.) may contain series data with a specific pattern, which can prevent a situation where the electronic devices couple to a wrong device through cables and are thus accidentally turned on.

In some embodiments, the control electronic device may divide the plurality of electronic devices into a plurality of sets of electronic devices, for turning on the electronic devices set by set. More particularly, according to respective power consumption information of at least a portion of (e.g. part or all of) the plurality of electronic devices and the predetermined instantaneous power consumption upper bound value (e.g. the power consumption information of the electronic device 105), the control electronic device may configure the number of the electronic devices divided into the first set of plurality of electronic devices, in order to prevent the overall instantaneous power consumption of the electronic system from exceeding the predetermined instantaneous power consumption upper bound value. For example, according to the respective power consumption information of the aforementioned at least a portion of electronic devices within the plurality of electronic devices and the predetermined instantaneous power consumption upper bound value, the control electronic device may determine the number of electronic devices within the plurality of electronic devices divided into the plurality of sets of electronic devices, in order to prevent the overall instantaneous power consumption of the electronic system from exceeding the predetermined instantaneous power consumption upper bound value.

In practice, the respective power consumption information of the aforementioned electronic devices may be information which is preloaded into the control electronic device, such as experimental data of the designer of the electronic system, the derivation data of the experimental data, the information predefined by the designer of electronic system, and/or the information predefined by the administrator of electronic system. This is merely for illustrative purposes, and not meant to be limitations of the present invention. According to some embodiments, the electronic system may pre-generate the respective power consumption information of the portion of electronic devices. More particularly, during a specific previous turning-on period of the electronic system, at least according to respective fundamental power consumption information of the portion of electronic devices (e.g. the power consumption of the electronic device 105 when not mounting a storage device such as an HDD or SSD), respective storage device numbers of the portion of electronic devices (e.g. the number of HDDs and/or SSDs), and storage device power consumption information of the storage devices (e.g. the power consumption of each HDD and/or SSD), the control electronic device may estimate power consumption of the portion of electronic devices, respectively, to generate the respective power consumption information of the portion of electronic devices. Further, the control electronic device may store the respective power consumption information of the portion of electronic devices into a storage unit in the control electronic device, such as a non-volatile memory, to control the number of the electronic devices within the plurality of electronic devices divided into the first set of electronic devices, and/or controlling the number of the electronic devices within the plurality of electronic devices divided into a specific set of electronic devices, wherein the examples of the non-volatile memory may comprise (but are not limited to) an electrically erasable programmable read-only memory (EEPROM) and a flash memory.

In these embodiments, the device for estimating respective power consumptions of the portion of electronic devices (for generating respective power consumption information of the portion of electronic devices) may comprise the control electronic device. This is merely for illustrative purposes, and not meant to be limitations of the present invention. For example, the device for estimating the respective power consumptions of the portion of electronic devices may comprise the portion of electronic devices. In another example, the device for estimating the respective power consumptions of the portion of electronic devices may comprise the control electronic device and the portion of electronic devices.

As mentioned above, the electronic system may utilize the control electronic device to transmit the first turning on signal to the first electronic device in order to trigger to turn on the first electronic device, and may utilize the first electronic device to transmit the second turning on signal to the second electronic device in order to trigger to turn on the second electronic device. For example, the electronic system may utilize the control electronic device to transmit a first turning off signal to the first electronic device to turn off the first electronic device. In another example, the electronic system may utilize the first electronic device to transmit a second turning off signal to the second electronic device to turn off the second electronic device.

Figure 3:
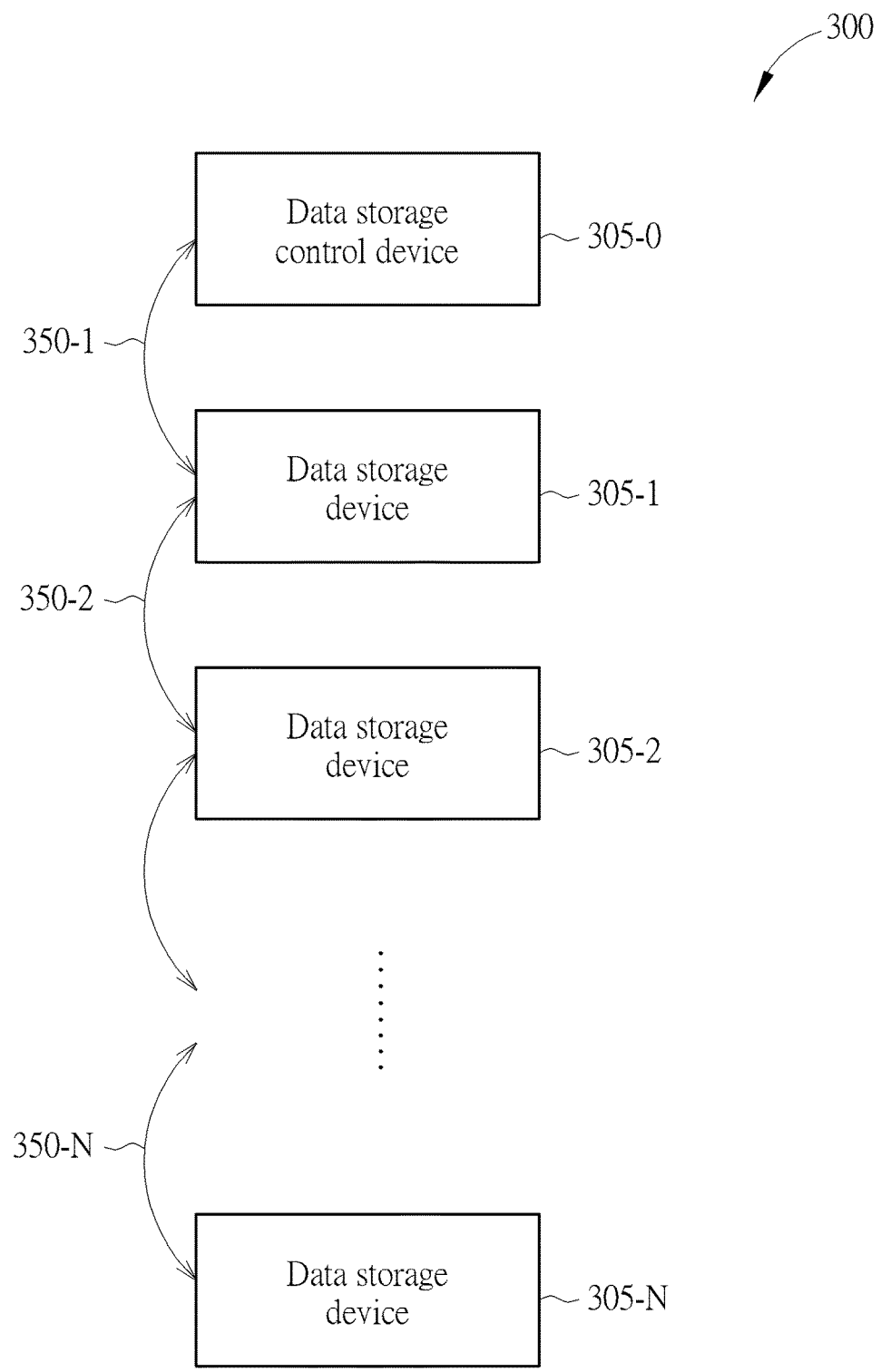
FIG. 3 is a diagram illustrating a control scheme associated with the method shown in FIG. 2 according to an embodiment of the present invention.

FIG. 3 is a diagram illustrating a control scheme associated with the method 200 shown in FIG. 2 according to an embodiment of the present invention. As shown in FIG. 3, a data storage system 300 may comprise a data storage control device 305-0 and N data storage devices 305-1, 305-2, . . . , and 305-N (the symbol N may represent a positive integer larger than 1), wherein the data storage control device 305-0 and the N data storage devices 305-1, 305-2, . . . , and 305-N may be coupled in series in a string through cables 350-2, . . . , and 350-N. For example, the data storage control device 305-0 may be implemented as the enclosure mentioned in the embodiment of FIG. 1 according to the SAS expander technique. Similarly, each of the N data storage devices 305-1, 305-2, . . . , and 305-N may also be implemented as the enclosure mentioned in the embodiment of FIG. 1 according to the SAS expander technique.

According to this embodiment, regarding the data storage device 305-$n$ within the N data storage devices 305-1, 305-2, . . . , and 305-N (the symbol n may represent a positive integer with [1, N]), an immediately prior device 305-($n$−1) may transmit a turning on signal to the specific data storage device 305-$n$ in order to trigger to turn on the specific data storage device 305-$n$. For example, if n=1, the immediately prior device 305-($n$−1) may represent the data storage control device 305-0; in another example, if n>1, the immediately prior device 305-($n$−1) may represent the data storage device 305-($n$−1). For better understanding, the data storage system 300 may be an example of the electronic system, the data storage control device 305-0 may be an example of the control electronic device, and the N data storage devices 305-1, 305-2, . . . , and 305-N may be examples of the electronic devices within the plurality of electronic devices except for the control electronic device. Hence, in this embodiment, the first electronic device mentioned in Step 210 may represent a data storage device (e.g. the data storage device 305-1) within the N data storage devices 305-1, 305-2, . . . , and 305-N; and the second electronic device mentioned in Step 220 may represent another data storage device (e.g. the data storage device 305-2) within the N data storage devices 305-1, 305-2, . . . , and 305-N.

In practice, regarding the data storage devices 305-($n0$−1) and 305-$n0$ (the symbol n0 may represent a positive integer with [2, N]) within the N data storage devices 305-1, 305-2, . . . , and 305-N electrically connected through the cable 350-$n0$, the timing of triggering to turn on data storage device 305-$n0$ may be later than the timing of triggering to turn on the data storage device 305-($n0$−1), to prevent the overall instantaneous power consumption of the electronic system from exceeding a predetermined instantaneous power consumption upper bound value. Some features of this embodiment which are identical to those of the previous embodiments are omitted here for brevity.

Figure 4:
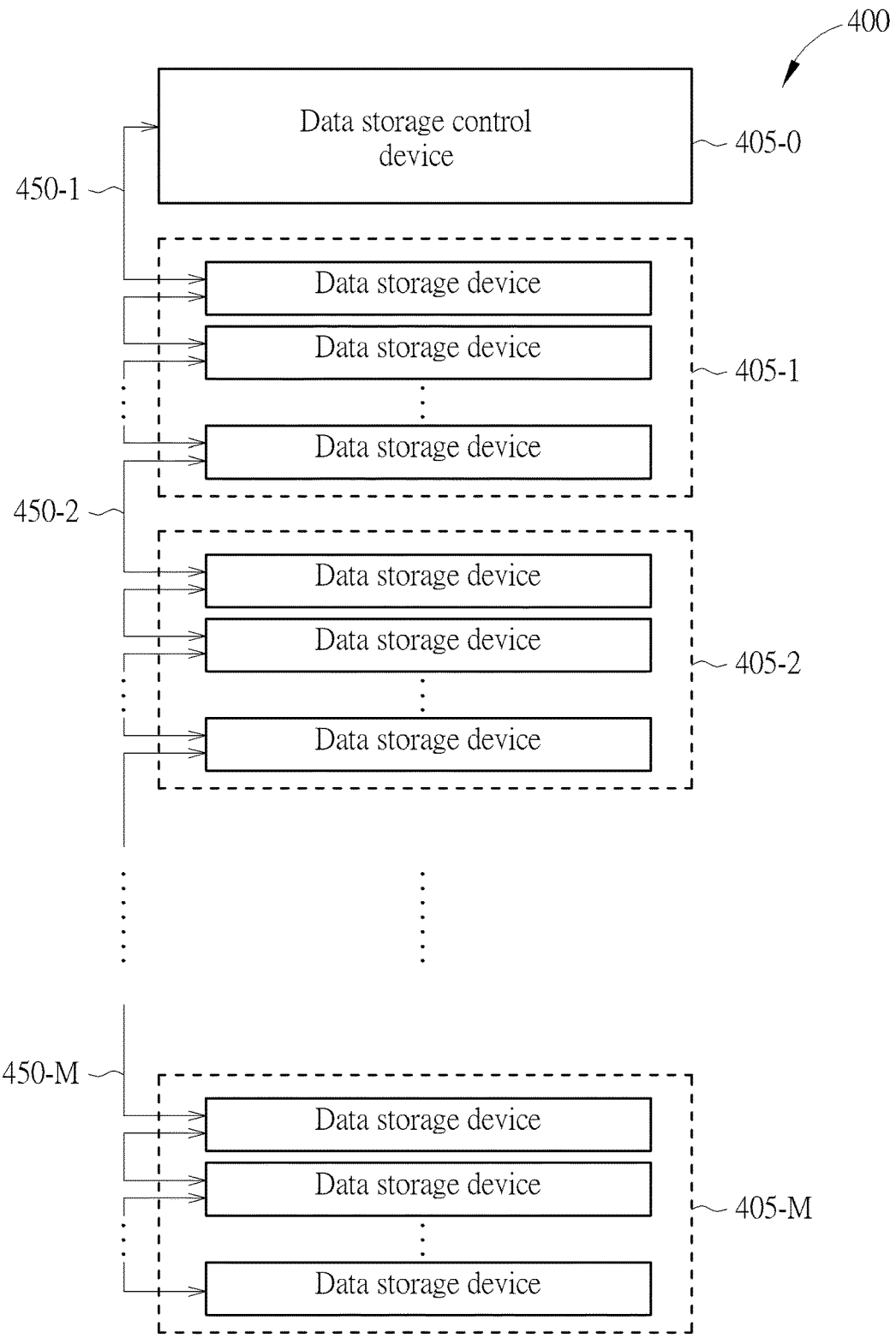
FIG. 4 is a diagram illustrating a control scheme associated with the method shown in FIG. 2 according to another embodiment of the present invention.

FIG. 4 is a diagram illustrating a control scheme associated with the method shown in FIG. 2 according to another embodiment of the present invention. As shown in FIG. 4, a data storage system 400 may comprise a data storage control device 405-0 and M sets of data storage devices 405-1, 405-2, . . . , and 405-M (the symbol M may represent a positive integer larger than 1), wherein the data storage control device 405-0 and the M sets of data storage devices 405-1, 405-2, . . . , and 405-M may be coupled in series in a string through cables 450-1, 450-2, . . . , and 450-M.

For better understanding, the data storage system 400 may be an example of the data storage system 300, the data storage control device 405-0 may be an example of the data storage control device 305-0, and all the M sets of data storage devices 405-1, 405-2, . . . , and 405-M may be an example of the N data storage devices 305-1, 305-2, . . . , and 305-N. Hence, the M sets of data storage devices 405-1, 405-2, . . . , and 405-M may be an example of the plurality of sets of electronic devices, wherein the sets of electronic devices may be obtained by dividing the data storage device. Further, the aforementioned first set of electronic devices in this embodiment may represent the first set of data storage devices 405-1 within the M sets of data storage devices 405-1, 405-2, . . . , and 405-M, and the aforementioned second set of electronic devices in this embodiment may represent the second set of data storage devices 405-2 within the M sets of data storage devices 405-1, 405-2, . . . , and 405-M.

In practice, regarding the sets of data storage devices 405-($m0$−1) and 405-$m0$ (the symbol m0 may represent a positive integer within [2, M]) electrically connected to each other within the M sets of data storage devices 405-1, 405-2, . . . , and 405-M, the timing of triggering to turn on the set of data storage devices 405-$m0$ may be later than the timing of triggering to turn on the set of data storage devices 405-($m0$−1), to prevent the overall instantaneous power consumption of the electronic system from exceeding the predetermined instantaneous power consumption upper bound value. For example, the data storage control device 405-0 may provide a user interface for the administrator to set delay parameters. The data storage control device 405-0 may refer to the delay parameters to preset the delay time of transmitting a turning on signal to a next data storage device when a current data storage device receives a turning on signal in order to control the sets of the data storage devices, wherein the data storage control device 405-0 may set the delay time between any two data storage devices within the same set as 0. Hence, the data storage control device 405-0 may transmit a turning on signal to the data storage device 305-1 within the first set of data storage devices 405-1. The data storage device 305-1 is turned on immediately after receiving the turning on signal, and then transmits a turning on signal to the data storage device 305-2 within the first set of data storage devices 405-1 without waiting for a delay time. The data storage device 305-2 is turned on when receiving the turning on signal, and the rest can be done in the same manner. Hence, the first set of data storage devices 405-1 may turn on simultaneously. Since the turning on interval between the last data storage device within the first set of data storage devices 405-1 and the first data storage device within the second set of data storage devices 405-2 may be preset as a positive value, the timing of triggering to turn on the second set of data storage devices 405-2 will be delayed, and the rest can be done in the same manner. Some features of this embodiment which are identical to those of the previous embodiments are omitted here for brevity.

Figure 5:
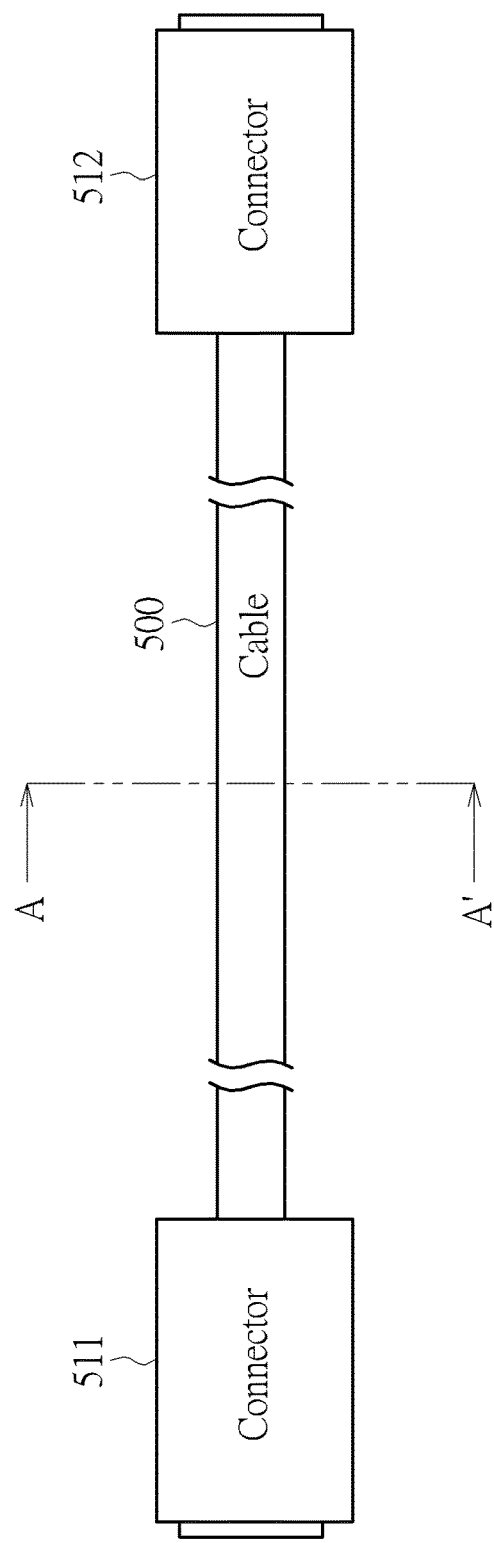
FIG. 5 is a diagram illustrating a cable associated with the method shown in FIG. 2 according to an embodiment of the present invention.

FIG. 5 is a diagram illustrating a cable 500 associated with the method 200 shown in FIG. 2 according to an embodiment of the present invention. The cable 500 may be an example of any of the cables 350-1, 350-2, . . . , and 350-N. Further, the connectors 511 and 512 are configured at the two ends of the cable 500. This is merely for illustrative purposes, and not meant to be limitations of the present invention. For example, the shapes and forms of the connector 511 and 512 can be modified.

Figure 6:
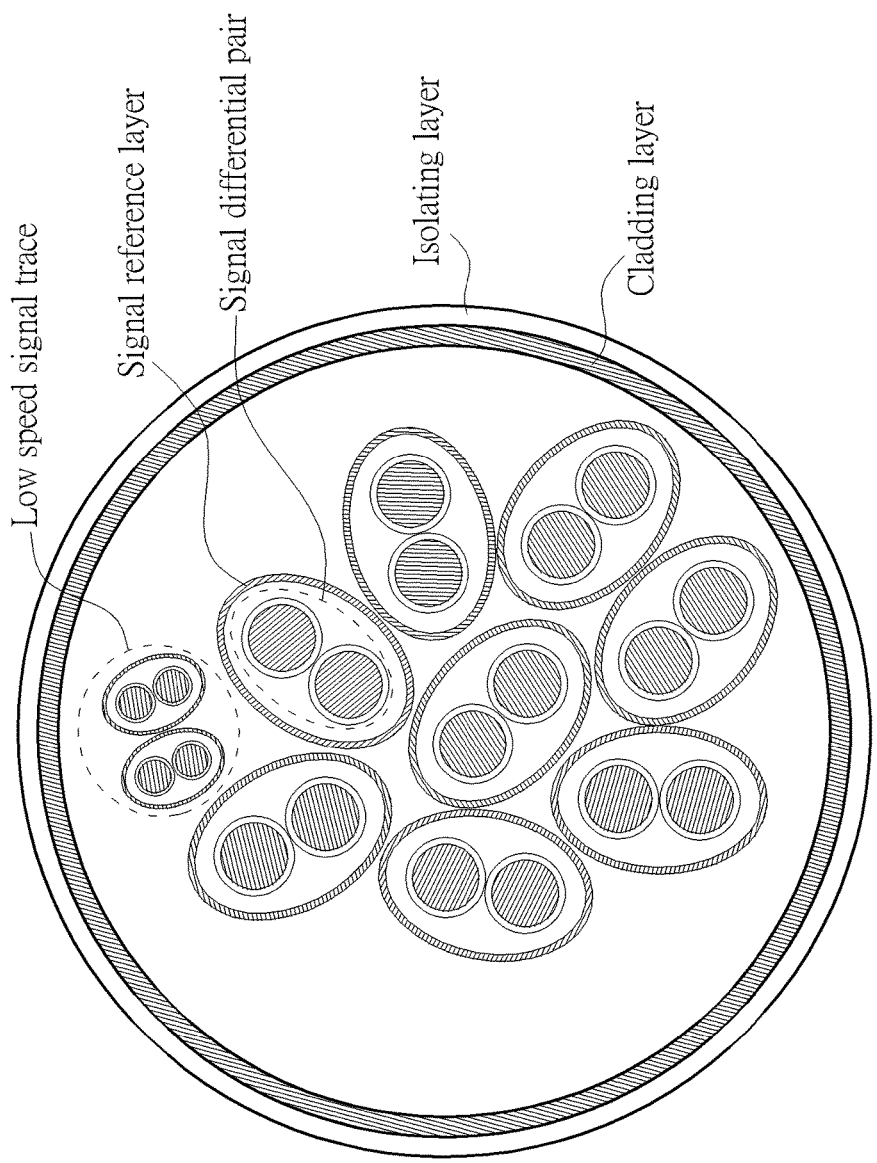
FIG. 6 is a diagram illustrating an inner structure of the cable shown in FIG. 5.

FIG. 6 is a diagram illustrating an inner structure of the cable 500 shown in FIG. 5, and more particularly, a cross section view along A-A', wherein the shaded part represents metal. As shown in FIG. 6, the cable 500 comprises eight sets of high speed signal traces and two sets of low speed signal traces, wherein each set of high speed signal traces within the eight sets of high speed signal traces is cladded by the signal reference layer, and each set of high speed signal traces mentioned above in this embodiment may be called a signal differential pair. Further, the outmost layer of the cable 500 is the isolating layer, and the isolating layer clads the cladding layer of the cable 500, wherein the cladding layer clads these eight sets of high speed signal traces and these two sets of low speed signal traces. In practice, based on the inner structure shown in FIG. 6, the aforementioned signal reference layer and the cladding layer in the cable 500 may electrically connect to each other. Hence, when any of the aforementioned signal reference layer and cladding layer is electrically connected to the respective chassis grounds of the connectors 511 and 512, the result is that both the aforementioned signal reference layer and cladding layer are electrically connected to the respective chassis grounds of the connectors 511 and 512. Further, the electronic system may utilize the eight sets of high speed signal traces to perform data access or information exchange (e.g. exchanging information related to power management between the plurality of electronic devices). Any one set of low speed signal traces in the two sets of low speed signal trace may transmit or receive a turning on signal (e.g. the first turning on signal or the second turning on signal), and may also transmit or receive a turning off signal (e.g. the first turning off signal or the second turning off signal). Note that, compared with high speed signals within the eight sets of high speed signal traces, any of the turning on signal and the turning off signal may be viewed as an out-of-band (OOB) signal. According to some embodiments, a turning on signal maybe transmitted through the low speed signal trace shown in FIG. 6. In practice, the cable 500 in these embodiments may conform to the SAS 3.0 specification. Further, a turning off signal may be transmitted through the high speed signal trace shown in FIG. 6.

Figure 7:
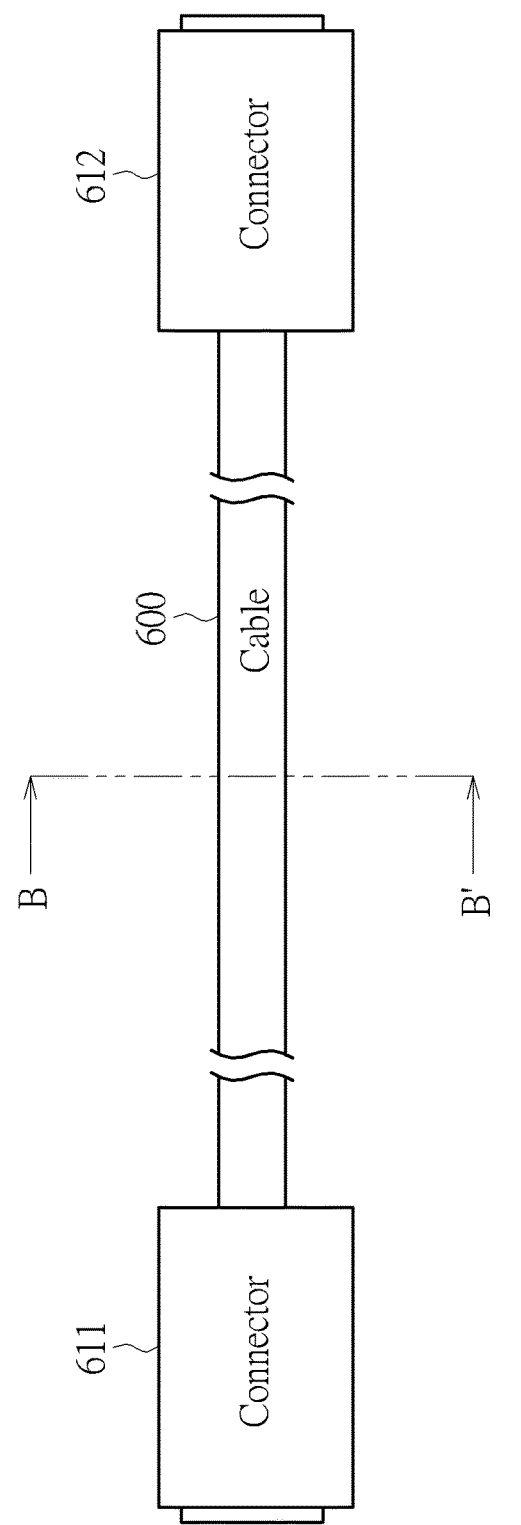
FIG. 7 is a diagram illustrating a cable associated with the method shown in FIG. 2 according to another embodiment of the present invention.

FIG. 7 is a diagram illustrating a cable 600 associated with the method 200 shown in FIG. 2 according to another embodiment of the present invention. The cable 600 may be an example of any of the cables 350-1, 350-2, . . . , and 350-N. Further, the two ends of the cable 600 are installed with connectors 611 and 612, respectively. This is merely for illustrative purposes, and not meant to be limitations of the present invention. For example, the shapes and forms of the connectors 611 and 612 can be modified.

Figure 8:
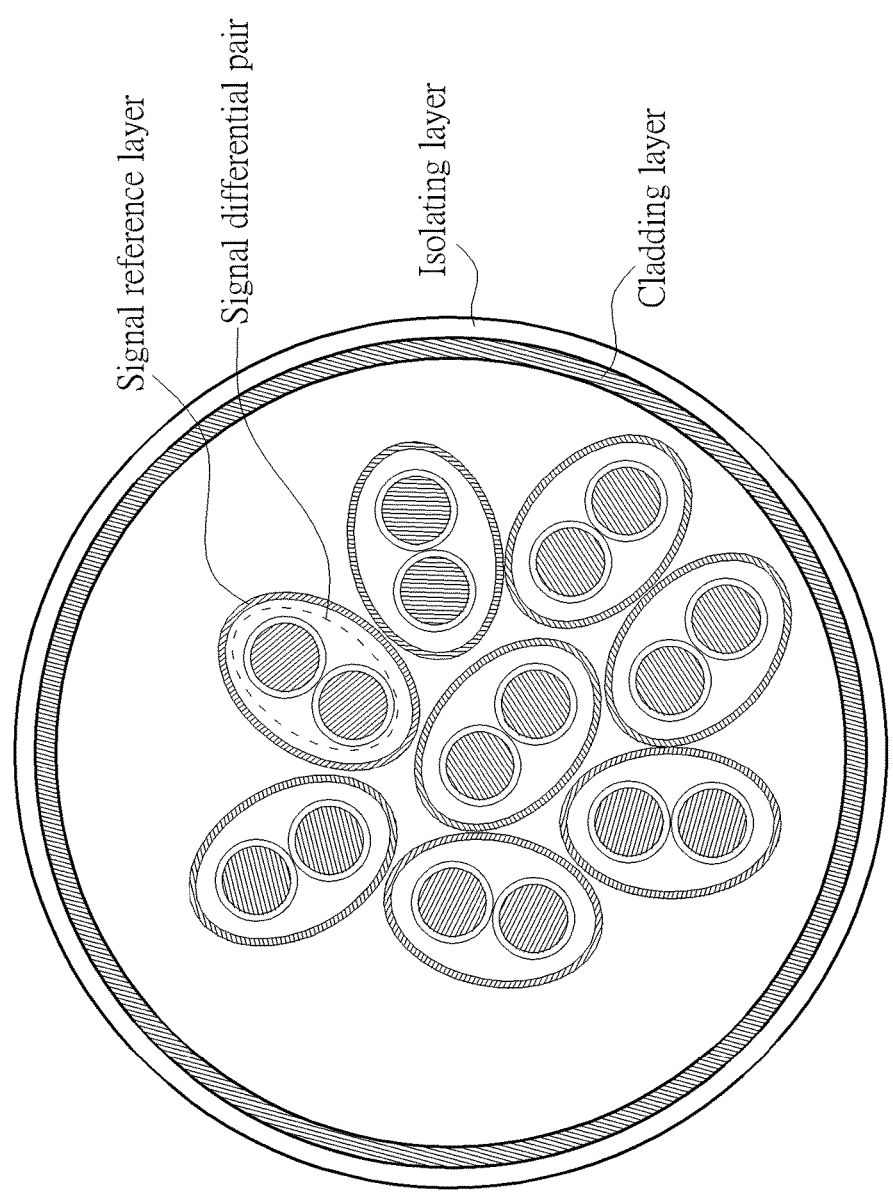
FIG. 8 is a diagram illustrating an inner structure of the cable shown in FIG. 7.

FIG. 8 is a diagram illustrating an inner structure of the cable 600 shown in FIG. 7, and more particularly, the cross-sectional view along B-B', wherein the shaded part represents metal. As shown in FIG. 8, the cable 600 comprises eight sets of high speed signal traces, wherein each set of high speed signal traces within the eight sets of high speed signal traces is cladded by a signal reference layer, and the aforementioned sets of high speed signal traces in this embodiment may be called a signal differential pair. Further, the outmost layer of the cable 600 is an isolating layer, and the isolating layer clads the cladding layer of the cable 600, wherein the cladding layer clads the eight sets of high speed signal traces. In practice, based on the inner structure shown in FIG. 8, the signal reference layer in the cable 600 and the cladding layer may be electrically connected. Hence, when any of the signal reference layer and the cladding layer is electrically connected to the respective chassis grounds of the connectors 611 and 612, both the signal reference layer and the cladding layer are electrically connected to the respective chassis ground of the connectors 611 and 612. Further, the electronic system may utilize the eight sets of high speed signal traces to perform data access, or perform information exchange (e.g. exchanging information related to power management between the plurality of electronic devices).

According to some embodiments, the turning on signal may be transmitted through the signal reference layer shown in FIG. 8, wherein these signal reference layers are electrically connected to the respective chassis grounds of the connectors 611 and 612. In practice, the cable 600 cable 600 in these embodiments may conform to the SAS 2.0 specification. Further, a turning off signal may be transmitted through the high speed signal trace shown in FIG. 8.

Figure 9:
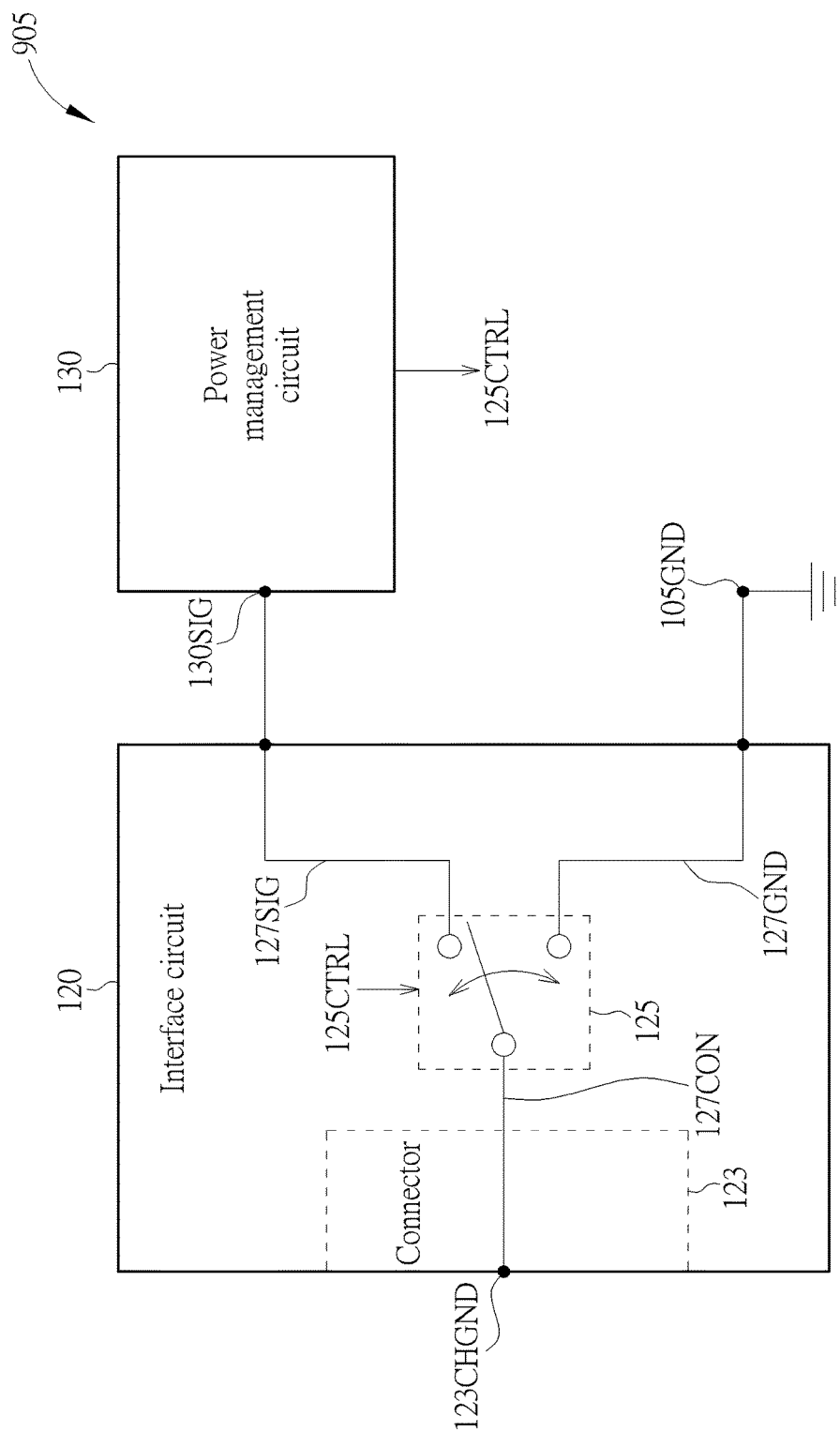
FIG. 9 is a diagram illustrating a signal transmission scheme associated with the method shown in FIG. 2 according to an embodiment of the present invention.

FIG. 9 is a diagram illustrating a signal transmission scheme associated with the method 200 shown in FIG. 2 according to an embodiment of the present invention. For example, the electronic device 905 may represent the data storage control device 305-0. In another example, the electronic device 905 may represent a specific data storage device 305-n. The interface circuit 120 in this embodiment may comprise a connector 123, a switching unit 125 and at least one set of selecting paths, such as a signal path and a ground path, wherein the signal path may comprise the partial paths 127CON and 127SIG, and the ground path may comprise the partial paths 127CON and 127GND. Further, the switching unit 125 may be implemented with at least one switch such as at least one metal oxide semiconductor field effect transistor (MOSFET). This is merely for illustrative purposes, and not meant to be limitations of the present invention.

As shown in FIG. 9, the power management circuit 130 may generate a switching control signal 125CTRL, and may utilize the switching control signal 125CTRL to control switching operations of the switching unit 125, to selectively enable one of the signal path and the ground path and disable the other of the signal path and the ground path. For example, the power management circuit 130 may utilize the switching control signal 125CTRL to enable the signal path to make the chassis ground 123CHGND in the connector 123 of the interface circuit 120 electrically connect to a signal terminal 130SIG of the power management circuit 130, rather than electrically connecting to a specific ground terminal 105GND of the electronic device 105. In another example, the power management circuit 130 may utilize the switching control signal 125CTRL to enable the ground path, making the chassis ground 123CHGND electrically connect to the specific ground terminal 105GND rather than electrically connecting to the signal terminal 130SIG.

Since the chassis ground 123CHGND may be electrically connected to the chassis ground of one of the connectors 611 and 612, and the signal reference layer of the cable 600 is electrically connected to the respective chassis grounds of the connectors 611 and 612, when the cable 600 is electrically connected to the interface circuit 120 and the power management circuit 130 utilizes the switching control signal 125CTRL to enable the signal path, the power management circuit 130 may utilize the signal reference layer in the cable 600 to perform signal transmissions, wherein the signal reference layer may transmit or receive a turning on signal (e.g. the first turning on signal or the second turning on signal). When the power management circuit 130 performs operations related to power management, the power management circuit 130 may control the switching unit 125 to enable the signal path, and prevent the chassis ground 123CHGND from electrically connecting to the specific ground terminal 105GND. Further, when the electronic device 105 performs data access operations, the power management circuit 130 may control the switching unit 125 to enable the ground path, in order to maintain the optimized impedance characteristic of the cable 600. Hence, the high speed signal in the eight sets of high speed signal traces may be correctly transmitted. Note that, compared with the high speed signal in eight sets of high speed signal traces, the turning on signal may be viewed as an OOB signal.

Figure 10:
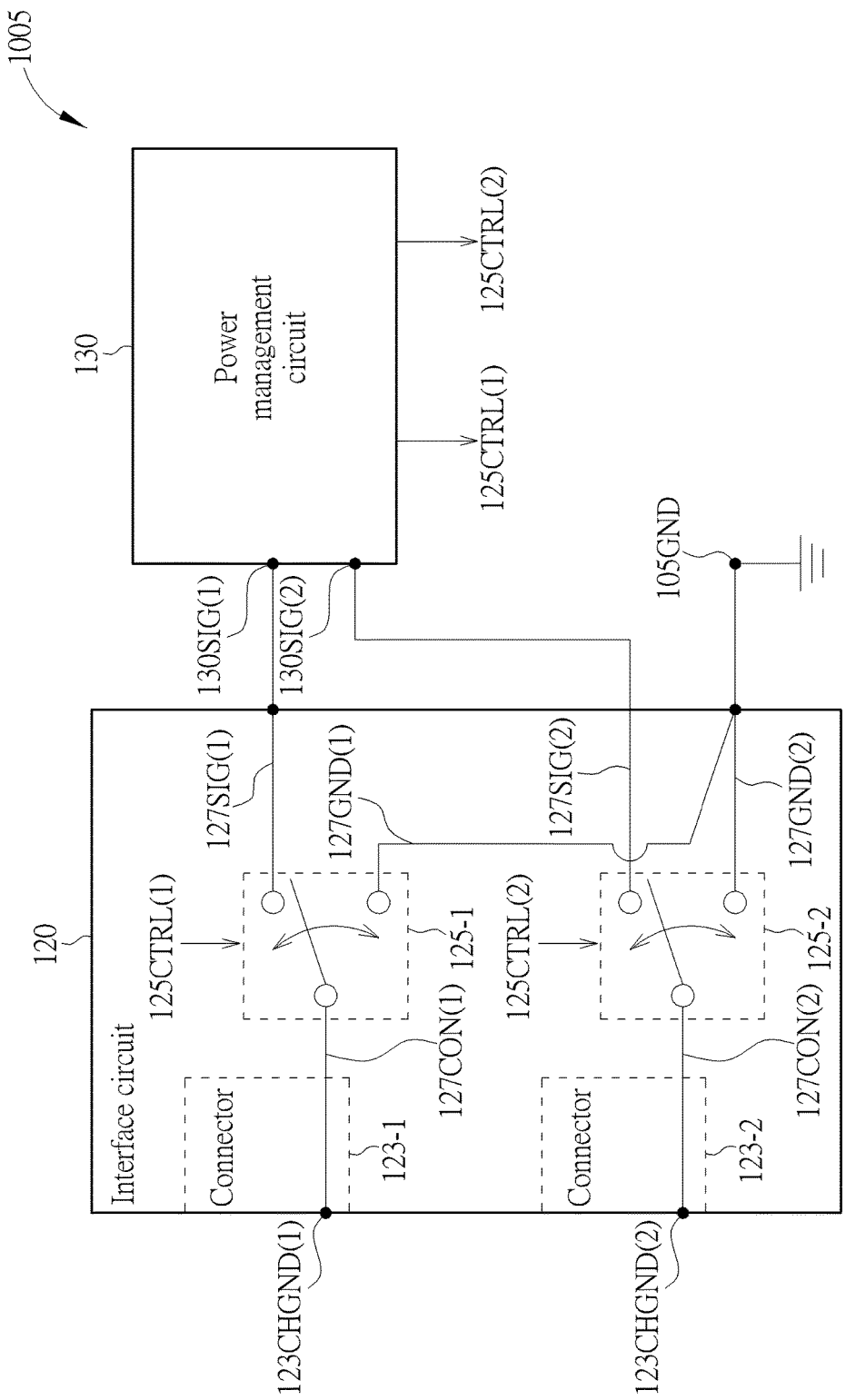
FIG. 10 is a diagram illustrating a signal transmission scheme associated with the method shown in FIG. 2 according to another embodiment of the present invention.

FIG. 10 is a diagram illustrating a signal transmission scheme associated with the method shown in FIG. 2 according to another embodiment of the present invention. The electronic device 1005 in FIG. 10 may represent a specific data storage device 305-$n$. Since the specific data storage device 305-$n$ comprises two connectors to be coupled as the data storage system 300 shown in FIG. 3, the interface circuit 120 in this embodiment may comprise connectors {123-1, 123-2}, a switching unit {125-1, 125-2} and two sets of selecting paths, corresponding to the connector 123, the switching unit 125 and the set of selecting paths shown in the embodiment of FIG. 9, respectively, wherein the partial paths {127CON (1), 127CON (2)}, {127SIG (1), 127SIG (2)} and {127GND (1), 127GND (2)} correspond to the partial paths 127CON, 127SIG and 127GND, respectively, the chassis grounds {123CHGND (1), 123CHGND (2)} and {130SIG (1), 130SIG (2)} correspond to the chassis ground 123CHGND and the signal terminal 130SIG, and the switching control signals {125CTRL (1), 125CTRL (2)} correspond to the switching control signal 125CTRL. Some features of this embodiment which are identical to those of the previous embodiments are omitted here for brevity.

According to some embodiments, the way in which the data storage control device 305-0 indicates the data storage device 305-1 to turn on can be modified. In an embodiment, the data storage control device 305-0 may transmit a turning on signal to the data storage device 305-1 after learning that the data storage device 305-1 is connected to the data storage control device 305-0. After the connector 123-1 of the data storage device 305-1 is coupled to the connector 123 of the data storage control device 305-0, the power management circuit 130 of the data storage device 305-1 will pull up the level of the chassis ground 123CHGND (1) of the connector 123-1, wherein the power management circuit 130 of the data storage device 305-1 may electrically connect the chassis ground 123CHGND (1) to the signal terminal 130SIG (1) thereof in advance, to facilitate pulling up the level. Hence, the data storage control device 305-0 may know that the data storage device 305-1 is coupled to the data storage control device 305-0. The data storage control device 305-0 may transmit a turning on signal to the data storage device 305-1 to turn on the data storage device 305-1, and disable the OOB signal path of the data storage control device 305-0 (i.e. by electrically connecting the chassis ground 123CHGND of connector 123 of the data storage control device 305-0 to a specific ground terminal 105GND of the data storage control device 305-0). When the data storage device 305-1 is turned on, the data storage device 305-1 may disable the OOB signal path corresponding to the connector 123-1 (i.e. by electrically connecting the chassis ground 123CHGND (1) of the connector 123-1 of the data storage device 305-1 to a specific ground terminal 105GND of the data storage device 305-1). For example, after a predetermined period (e.g. 5 or 10 sec), the data storage control device 305-0 may utilize the high speed signal trace in the cable 350-1 to transmit a turning on confirmation signal to the data storage device 305-1, in order to confirm whether the data storage device 305-1 is successfully turned on. If the data storage control device 305-0 does not receive any confirmation signal from the data storage device 305-1 for a predetermined period (e.g. 5 or 10 sec), the data storage control device 305-0 may once again enable the OOB signal path of the connector 123 (i.e. by electrically connecting the chassis ground 123CHGND of the connector 123 of the data storage control device 305-0 to the signal terminal 130SIG of the data storage control device 305-0), in order to transmit the turning on signal to the data storage device 305-1 again. Further, the way in which the data storage device 305-1 turns on the data storage device 305-2 may be identical to the way in which the data storage control device 305-0 turns on the data storage device 305-1, wherein the connector 123-1 of the data storage device 305-2 may couple to the connector 123-2 of the data storage device 305-1; the remaining operations can be performed in the same manner.

In another embodiment, the data storage control device 305-0 may periodically transmit a turning on signal to the chassis ground 123CHGND of the connector 123 of the data storage control device 305-0. When the connector 123-1 of the data storage device 305-1 is coupled to the connector 123 of the data storage control device 305-0, the power management circuit 130 of the data storage device 305-1 will receive the turning on signal and then turn on the data storage device 305-1, and disable the OOB signal path of the correspond to connector 123-1 (i.e. by electrically connecting the chassis ground 123CHGND (1) of the connector 123-1 of the data storage device 305-1 to the specific ground terminal 105GND of the data storage device 305-1). For example, after a predetermined period (e.g. 5 or 10 sec), the data storage control device 305-0 may utilize the high speed signal trace in the cable 350-1 to transmit a turning on confirmation signal to the data storage device 305-1, to confirm whether the data storage device 305-1 is successfully turned on. If the data storage control device 305-0 does not receive any confirmation signal sent back from the data storage device 305-1 for a predetermined period (e.g. 5 or 10 sec), the data storage control device 305-0 may once again turn on the OOB signal path of the connector 123, to once again transmit a turning on signal to the data storage device 305-1. Further, the way in which the data storage device 305-1 turns on the data storage device 305-2 may be identical to the way in which the data storage control device 305-0 turns on the data storage device 305-1, wherein the connector 123-1 of the data storage device 305-2 may couple to the connector 123-2 of the data storage device 305-1, and the remaining operations can be performed in the same manner.

In some embodiments, there are two connectors {123-1, 123-2} on the interface circuit 120 of the data storage device 305-1, wherein the connector 123-1 is coupled to the data storage control device 305-0, and the connector 123-2 is coupled to the data storage device 305-2. Assuming that the data storage device 305-1 has coupled to the data storage control device 305-0, and the data storage device 305-2 has not yet coupled to the data storage device 305-1, when the data storage device 305-1 is in the standby mode, the power management circuit 130 of the data storage device 305-1 will disconnect both the chassis ground 123CHGND (1) of the connector 123-1 and the chassis ground 123CHGND (2) of the connector 123-2 from the specific ground terminal 105GND. When the data storage control device 305-0 indicates the data storage device 305-1 to enter a turned-on mode from the standby mode, the power management circuit 130 of the data storage device 305-1 will be electrically connected by the chassis ground 123CHGND (1) of the connector 123-1 to the specific ground terminal 105GND. Meanwhile, the power management circuit 130 of the data storage device 305-1 still continues disconnecting the chassis ground 123CHGND (2) of the control connector 123-2 from the specific ground terminal 105GND. After that, when the data storage device 305-2 is coupled to the data storage device 305-1, the power management circuit 130 of the data storage device 305-1 may transmit a turning on signal to the data storage device 305-2 through an OOB signal path corresponding to the connector 123-2, and then electrically connect the chassis ground 123CHGND (2) of the connector 123-2 to the specific ground terminal 105GND.

In some embodiments, the power management circuit 130 of the specific data storage device 305-$n$ may switch between the signal path of the connector 123-1 of the specific data storage device 305-$n$ according to whether the specific data storage device 305-$n$ is in the standby mode or in the turned-on mode. Further, the power management circuit 130 of the specific data storage device 305-$n$ may switch between the signal path of the connector 123-2 of the specific data storage device 305-$n$ according to whether the specific data storage device 305-$n$ transmits a turning on signal to a next data storage device (e.g. the data storage device 305-$(n+1)$), wherein the operation principles of the connector 123-2 of the specific data storage device 305-$n$ may be identical to those of the connector 123 of the data storage control device 305-0.

Figure 11:
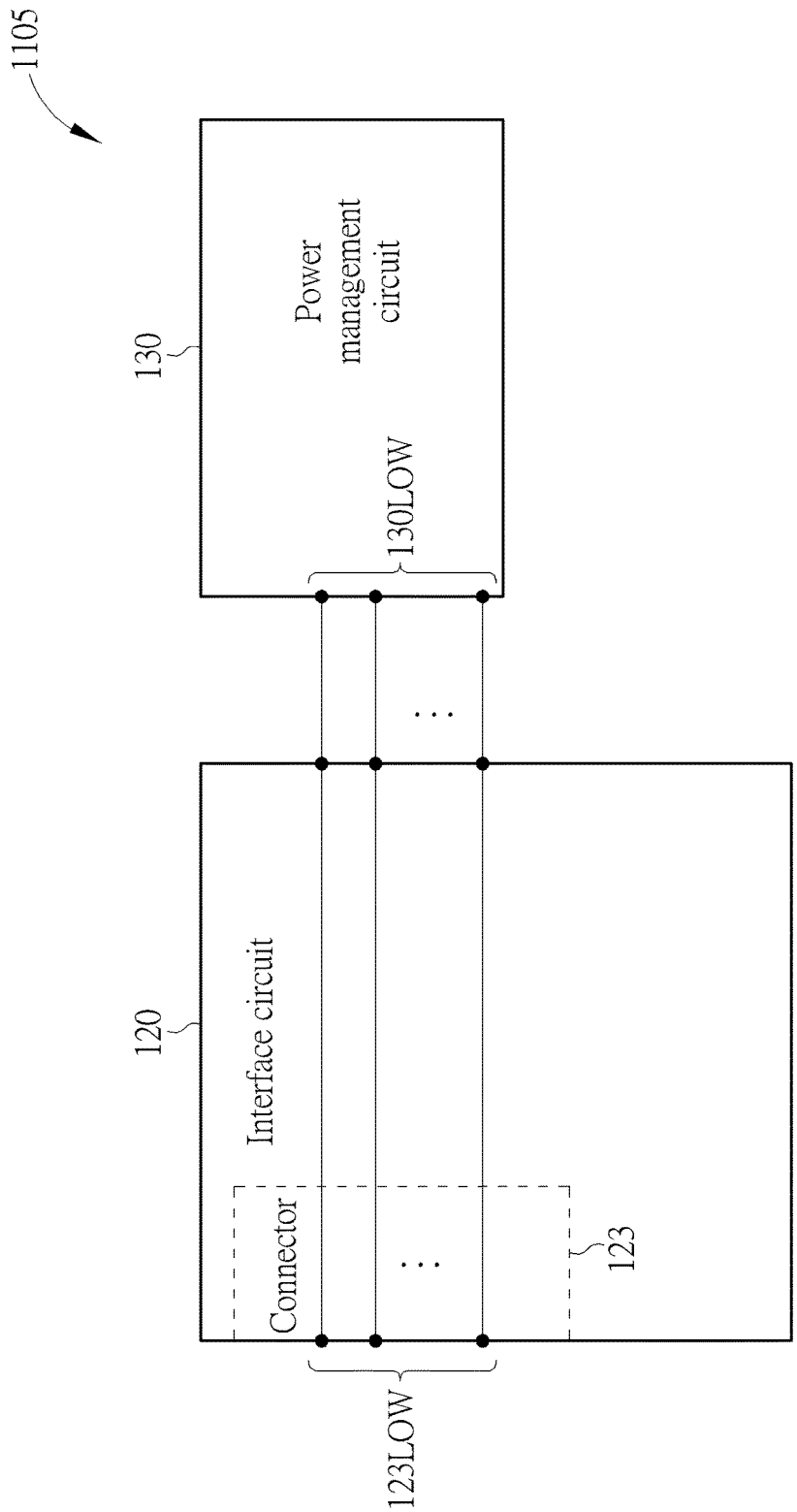
FIG. 11 is a diagram illustrating a signal transmission scheme associated with the method shown in FIG. 2 according to yet another embodiment of the present invention.

FIG. 11 is a diagram illustrating a signal transmission scheme associated with the method 200 shown in FIG. 2 according to yet another embodiment of the present invention. The electronic device 1105 in FIG. 11 may represent the data storage control device 305-0. In another example, the electronic device 1105 may represent the specific data storage device 305-$n$. The embodiment shown in FIG. 9, the configurations of the switching unit 125 and the set of selecting paths previously mentioned in the embodiment shown in FIG. 9 may be omitted in this embodiment. Note that the connector 123 in this embodiment may comprise a set of low speed signal terminals 123LOW for coupling to the low speed signal traces shown in FIG. 6, wherein the power management circuit 130 may comprise a corresponding set of low speed signal terminals 130LOW.

According to this embodiment, the turning on signal may be transmitted by at least a portion of low speed signal trace within the low speed signal traces. In practice, the cable 500 in this embodiment may conform to the SAS 3.0 specification. For example, the power management circuit 130 of the specific data storage device 305-$n$ may comprise the set of low speed signal terminals 130LOW. When the cable 500 is connected to the connector 123 of the interface circuit 120 of the specific data storage device 305-$n$ through a specific connector thereof (e.g. the connectors 511 or 512), the low speed signal traces in the cable 500 may be coupled to the set of low speed signal terminals 130LOW of the power management circuit 130 through the set of low speed signal terminals 123LOW. Some features of this embodiment which are identical to those of the previous embodiments are omitted here for brevity.

According to some embodiments, the data storage system 300 may comprise an enclosure (or a frame) for installing and fixing the data storage control device 305-0 and the data storage devices 305-1, 305-2, ..., 305-N. When respective power traces of the data storage control device 305-0 and the data storage devices 305-1, 305-2, ..., 305-N are coupled to the power supply in the enclosure, the power supply will keep supplying power to the respective power management circuits {130} of the data storage control device 305-0 and the data storage devices 305-1, 305-2, ..., 305-N. When all the data storage devices 305-1, 305-2, ..., 305-N are in the standby mode, the power supply may provide power to the power management circuits {130} only, thus avoiding various related art issues of large power consumption. For example, the conventional data storage system operates continuously and thereby consumes much power; in another example, the conventional data storage system still consumes much power even when the HDD therein stops performing access operations. Therefore, the data storage system 300 of the present invention may achieve high power-saving in the standby mode.

An advantage provided by the present invention is that the power consumption of the electronic system may be reduced. Take a scheme having two-headers and fifteen enclosures as example. The overall power consumption of the standby electronic system is about a hundred Watts (W). Compared with related arts, the method and associated device and computer programmable product of the present invention may greatly reduce the power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing power management in an electronic system, the method applied to a first electronic device within a plurality of electronic devices of the electronic system, the method comprising:
   when a first turning on signal transmitted from another electronic device within the plurality of electronic devices is received, utilizing a power management circuit of the first electronic device to provide power to a processing circuit of the first electronic device in response to the trigger of the first turning on signal in order to trigger to turn on the first electronic device, wherein the first electronic device is coupled to the other electronic device; and
   utilizing the power management circuit of the first electronic device to transmit a second turning on signal to a second electronic device within the plurality of electronic devices through an interface circuit of the first electronic device in order to trigger to turn on the second electronic device, wherein the second electronic device is coupled to the other electronic device through the first electronic device;
   wherein the power management circuit receives the first turning on signal through a chassis ground of a connector of the interface circuit; the interface circuit comprises a switching unit arranged to switch between a signal path and a ground path, wherein the signal path locates between the chassis ground of the connector and a signal terminal of the power management circuit, and the ground path locates between the chassis ground of the connector and a specific ground terminal of the first electronic device; and the method further comprises:
   utilizing the power management circuit to generate a switching control signal and utilizing the switching control signal to control a switching operation of the switching unit, in order to selectively enable one of the signal path and the ground path, and selectively disable the other of the signal path and the ground path.

2. The method of claim 1, wherein the power management circuit transmits the second turning on signal through a chassis ground of another connector in the interface circuit; the interface circuit comprises another switching unit arranged to switch between another signal path and another ground path, wherein the other signal path locates between the chassis ground of the other connector and another signal terminal of the power management circuit, and the other ground path locates between the chassis ground of the other connector and the specific ground terminal of the first electronic device; and the method further comprises:

utilizing the power management circuit to generate another switching control signal, and utilizing the other switching control signal to control a switching operation of the other switching unit, to selectively enable one of the other signal path and the other ground path and disable the other of the other signal path and the other ground path.

3. The method of claim 1, wherein the power management circuit receives the first turning on signal through a set of low speed signal terminals of the connector and a set of low speed signal terminals of the power management circuit.

4. The method of claim 1, wherein a timing of triggering to turn on the second electronic device is later than a timing of triggering to turn on the first electronic device, to prevent an overall instantaneous power consumption of the electronic system from exceeding a predetermined instantaneous power consumption upper bound value.

5. The method of claim 1, wherein the plurality of electronic devices comprises a first set of electronic devices and a second set of electronic devices, and the first set of electronic devices comprise the first electronic device and the second electronic device; and an electronic device within the first set of electronic devices transmits a turning on signal to an electronic device within the second set of electronic devices in order to trigger to turn on the second set of electronic devices, wherein the second set of electronic devices are coupled to the first set of electronic devices; wherein a timing of triggering to turn on the second set of electronic devices is later than a timing of triggering to turn on the first set of electronic devices, to prevent an overall instantaneous power consumption of the electronic system from exceeding a predetermined instantaneous power consumption upper bound value.

6. A method for performing power management in an electronic system, the method applied to a control electronic device of a plurality of electronic devices of the electronic system, the method comprising:

utilizing a power management circuit of the control electronic device to transmit a first turning on signal to a first electronic device within the plurality of electronic devices through an interface circuit of the control electronic device in order to trigger to turn on the first electronic device, wherein the first electronic device is coupled to the control electronic device; and when the first electronic device is turned on, utilizing the first electronic device to transmit a second turning on signal to a second electronic device within the plurality of electronic devices in order to trigger to turn on the second electronic device, wherein the second electronic device is coupled to the control electronic device through the first electronic device;

wherein the power management circuit transmits the first turning on signal through a chassis ground of a connector in the interface circuit; the interface circuit comprises a switching unit, arranged to switch between a signal path and a ground path, wherein the signal path locates between the chassis ground of the connector and a signal terminal of the power management circuit, and the ground path locates between the chassis ground of the connector and a specific ground terminal of the first electronic device; and the method further comprises:

utilizing the power management circuit to generate a switching control signal and utilizing the switching control signal to control a switching operation of the switching unit, in order to selectively enable one of the signal path and the ground path, and selectively disable the other of the signal path and the ground path.

7. The method of claim 6, wherein the power management circuit transmits the first turning on signal through a set of low speed signal terminals of the connector and a set of low speed signal terminals of the power management circuit.

8. The method of claim 6, wherein a timing of triggering to turn on the second electronic device is later than a timing of triggering to turn on the first electronic device, to prevent an overall instantaneous power consumption of the electronic system from exceeding a predetermined instantaneous power consumption upper bound value.

9. The method of claim 6, wherein the plurality of electronic devices comprise a first set of electronic devices and a second set of electronic devices, and the first set of electronic devices comprise the first electronic device and the second electronic device; and an electronic device within the first set of electronic devices transmits a turning on signal to an electronic device within the second set of electronic devices in order to trigger to turn on the second set of electronic devices, wherein the second set of electronic devices are coupled to the first set of electronic devices; wherein a timing of triggering to turn on the second set of electronic devices is later than a timing of triggering to turn on the first set of electronic devices, to prevent an overall instantaneous power consumption of the electronic system from exceeding a predetermined instantaneous power consumption upper bound value.

10. The method of claim 9, further comprising:

according to respective fundamental power consumption information of at least a portion of the electronic devices, respective numbers of storage devices of the portion of the electronic devices, and power consumption information of the storage devices, estimating respective power consumptions of the portion of the electronic devices, generating respective power consumption information of the portion of the electronic devices; and according to the respective power consumption information of the portion of the electronic devices and the predetermined instantaneous power consumption upper bound value, controlling a number of devices within the plurality of electronic devices divided into the first set of electronic devices.

11. The method of claim 6, wherein each of the first turning on signal and the second turning on signal contains series data with a specific pattern.

12. An apparatus for performing power management in an electronic system, the apparatus comprising at least a portion of a first electronic device within a plurality of electronic devices of the electronic system, the apparatus comprising:

a processing circuit, arranged to control an operation of the first electronic device;

at least one interface circuit, coupled to the processing circuit, and electrically connected to at least another electronic device within the plurality of electronic devices through at least one cable; and a power management circuit, coupled to the interface circuit and the processing circuit, the power management circuit arranged to control power of the processing circuit, wherein when the power management circuit receives a first turning on signal transmitted from another electronic device within the plurality of electronic devices through the interface circuit, the power management circuit turns on the processing circuit and provides power to the processing circuit in response to triggering of the first turning on signal, wherein the first electronic device is coupled to the other electronic device through the interface circuit, and the power management circuit transmits a second turning on signal to a second electronic device within the plurality of electronic devices through the interface circuit, in order to trigger to turn on the second electronic device, wherein the second electronic device is coupled to the other electronic device through the first electronic device:

wherein the interface circuit comprises:
a connector, wherein the connector comprises:
a chassis ground, wherein the power management circuit receives the first turning on signal through the chassis ground of the connector; and
switching unit, coupled to the chassis ground of the connector, the switching unit arranged to switch between a signal path and a ground path wherein the signal path locates between the chassis ground of the connector and a signal terminal of the power management circuit, and the ground path locates between the chassis ground of the connector and a specific ground terminal of the first electronic device; and
the power management circuit generates a switching control signal and utilizes the switching control signal to control a switching operation of the switching unit, in order to selectively enable one of the signal path and the ground path and disable the other of the signal path and the ground path.

13. The apparatus of claim 12, wherein the interface circuit further comprises:

another connector, comprising:
a chassis ground, wherein the power management circuit transmits the second turning on signal through the chassis ground of the other connector; and
another switching unit, coupled to the chassis ground of the other connector, the other switching unit arranged to switch between another signal path and another ground path, wherein the other signal path locates between the chassis ground of the other connector and another signal terminal of the power management circuit, and the other ground path locates between the chassis ground of the other connector and the specific ground terminal of the first electronic device;
wherein the power management circuit generates another switching control signal, and utilizes the other switching control signal to control a switching operation of the other switching unit, to selectively enable one of the other signal path and the other ground path and disable the other of the other signal path and the other ground path.

14. The apparatus of claim 12, wherein the power management circuit receives the first turning on signal through a set of low speed signal terminals of the connector and a set of low speed signal terminals of the power management circuit.

15. An apparatus for performing power management in an electronic system, the apparatus comprising at least a portion of a first electronic device within a plurality of electronic devices of the electronic system, the apparatus comprising: a processing circuit, arranged to control an operation of a control electronic device; at least one interface circuit, coupled to the processing circuit, and the interface circuit arranged to electrically connect to at least another electronic device within the plurality of electronic devices through at least one cable, to allow the control electronic device to control the electronic system; and a power management circuit, coupled to the interface circuit and the processing circuit, the power management circuit arranged to control power of the processing circuit, wherein the power management circuit transmits a first turning on signal to a first electronic device within the plurality of electronic devices through the interface circuit in order to trigger to turn on the first electronic device, wherein the first electronic device is coupled to the control electronic device, and when the first electronic device is turned on, the power management circuit utilizes the first electronic device to transmit a second turning on signal to a second electronic device within the plurality of electronic devices in order to trigger to turn on the second electronic device, wherein the second electronic device is coupled to the control electronic device through the first electronic device, wherein the power management circuit receives the first turning on signal through a chassis ground of a connector of the interface circuit; the interface circuit comprises a switching unit arranged to switch between a signal path and a ground path, wherein the signal path locates between the chassis ground of the connector and a signal terminal of the power management circuit, and the ground path locates between the chassis ground of the connector and a specific ground terminal of the first electronic device; and the method further comprises: utilizing the power management circuit to generate a switching control signal and utilizing the switching control signal to control a switching operation of the switching unit, in order to selectively enable one of the signal path and the ground path, and selectively disable the other of the signal path and the ground path.

16. The apparatus of claim 15, wherein the plurality of electronic devices comprises a first set of electronic devices and a second set of electronic devices, and the first set of electronic devices comprise the first electronic device and the second electronic device; and an electronic device within the first set of electronic devices transmits a turning on signal to an electronic device within the second set of electronic devices, in order to trigger to turn on the second set of electronic devices, wherein the second set of electronic devices are coupled to the first set of electronic devices; wherein a timing of triggering to turn on the second set of electronic devices is later than a timing of triggering to turn on the first set of electronic devices, to prevent an overall instantaneous power consumption of the electronic system from exceeding a predetermined instantaneous power consumption upper bound value.

17. The apparatus of claim 16, wherein according to respective fundamental power consumption information of at least a portion of the electronic devices, respective numbers of storage devices of the portion of the electronic devices and power consumption information of the storage devices, the control electronic device estimates respective power consumptions of the portion of the electronic devices, to generate respective power consumption of the portion of the electronic devices; and according to the respective power consumption information of the portion of the electronic devices and the predetermined instantaneous power consumption upper bound value, the control electronic device controls a number of devices within the plurality of electronic devices divided into the first set of electronic devices.

* * * * *